Aug. 9, 1966 H. HUBER 3,264,853
PRESS FOR FORMING WORK PIECES FROM WIRE AND BAR STOCK
Filed April 26, 1963 5 Sheets-Sheet 3

INVENTOR
Hans Huber

Aug. 9, 1966       H. HUBER       3,264,853
PRESS FOR FORMING WORK PIECES FROM WIRE AND BAR STOCK
Filed April 26, 1963       5 Sheets-Sheet 4
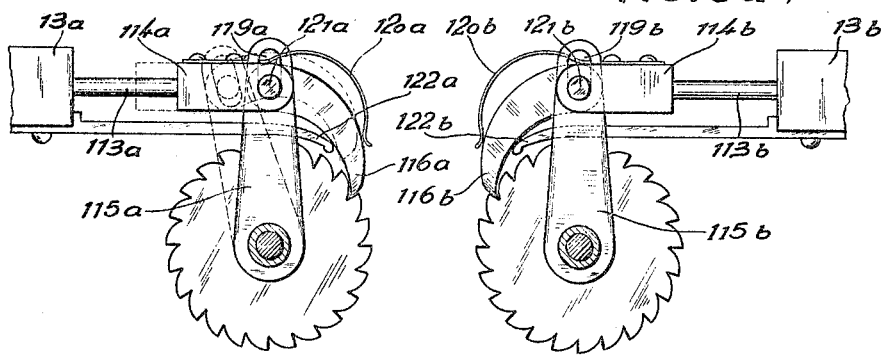
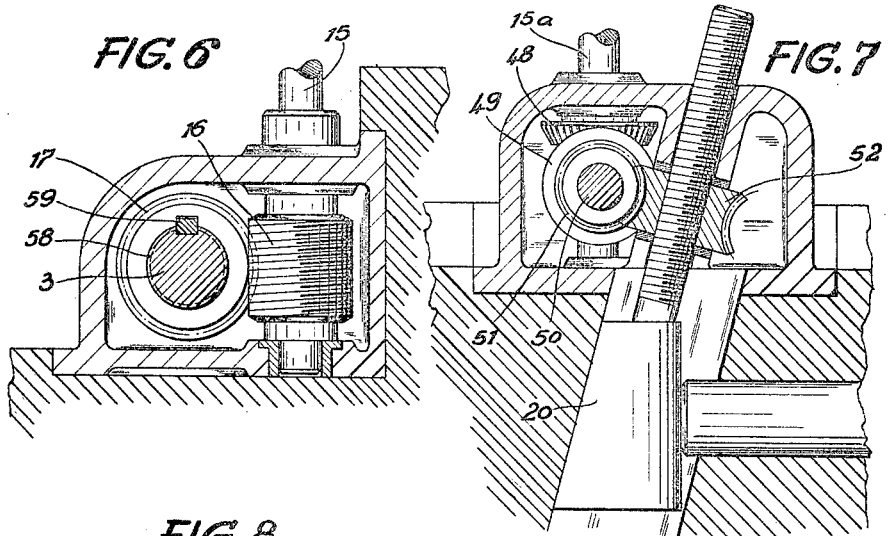
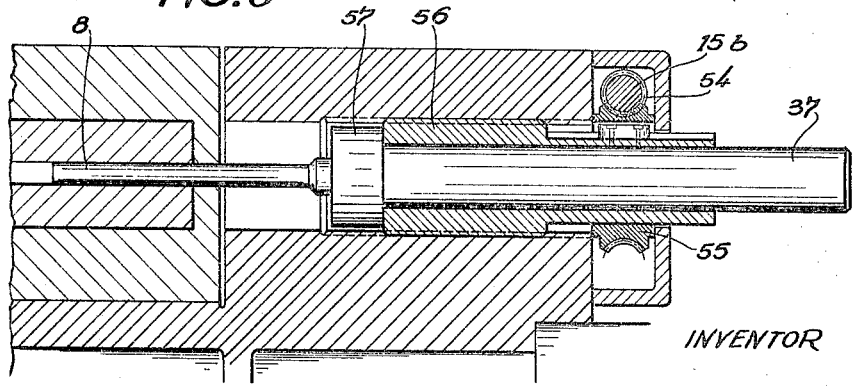
INVENTOR
Hans Huber

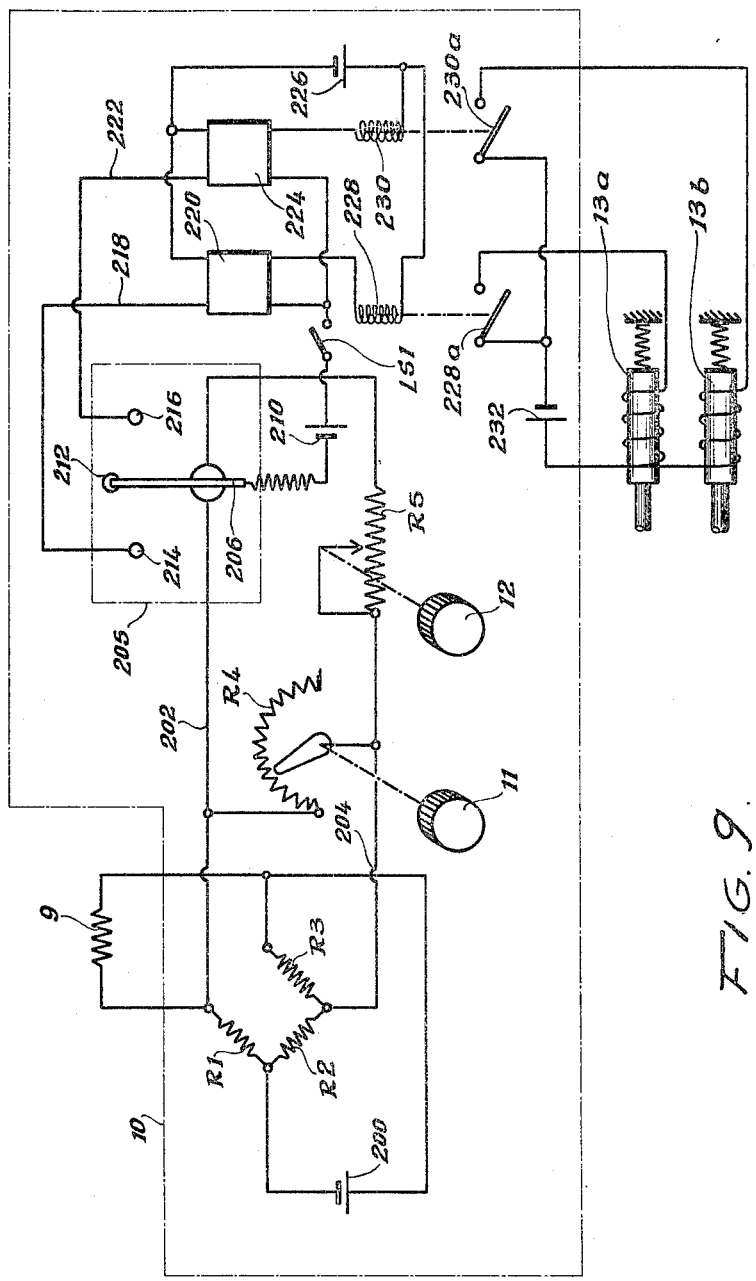

United States Patent Office 3,264,853
Patented August 9, 1966

3,264,853
PRESS FOR FORMING WORK PIECES FROM WIRE AND BAR STOCK
Hans Huber, Basel, Switzerland, assignor to Fritz Bernhard Hatebur, Basel, Switzerland
Filed Apr. 26, 1963, Ser. No. 275,955
7 Claims. (Cl. 72—10)

The present invention relates to a press for forming work pieces in a chip-less manner from wire and bar stock. Automatically operating warm and cold transforming machines or presses are known which, starting from wire or bar stock of iron or non-ferrous materials, transform the blanks in an automatic working cycle into mass produced articles. With this type of machines, there is provided a driven shearing knife shearing off from a bar or wire the quantity of material required for the finished work piece including the waste. This sheared off blank is then in one or more transforming stages transformed into the desired product.

With warm transforming machines, the bar or wire material is, during the feeding of the blank into the machine, heated up to forging temperature by oil, gas or induction heating. When wire and bar stock material is involved, as a rule rolling mill products are employed. With cold presses, drawn material is employed. The raw material is in view of its pre-treatment in most instances not completely uniform in cross section, in other words, cross sectional tolerances are present. In this connection, two main groups can be ascertained, namely (a) Tolerances occurring within the same bar or wire, and (b) Tolerances of the individual successive bars or wires which in most instances are greater than those under (a) because the individual raw material bars or wire rings have not always been rolled or drawn on the same production machine or by the same tool.

As a rule, the heretofore known presses or transforming machines can absorb the tolerances mentioned under (a) without post-setting or control, which means that the parts to be produced will again permit certain tolerances. If, however, successively new bars or wires are being processed, it is necessary during the introduction into the press or transforming machine to correct the shearing-off length in order to correct the possibly occurring higher or lower differences in the quantity of the working material in one or the other direction. This requires that the operator will have to check, after each change in the bar or wire material, the first pieces produced by the machine. This checking may be effected by measuring or weighing whereupon the shearing-off length has again to be set. This post-measuring and weighing of each series of newly produced products is time consuming and results in a reduced production of work pieces per time unit.

It is, therefore, an object of the present invention to provide means which will overcome the above mentioned drawbacks.

It is another object of this invention to provide means in connection with presses or transforming machines of the above mentioned type which will make it superfluous to weigh or check the produced work pieces.

It is still another object of this invention to provide an arrangement as set forth in the preceding paragraphs, which will automatically adjust the shearing-off length or the die chamber in conformity with the required material if necessary without necessitating an action on the part of the operator.

These and other objects and advantages of the invention will appear more clearly from the following specification in connection with the accompanying drawings, in which:

FIGURES 5 and 5a are detailed views of the ratchet arrangements of FIG. 1.

FIG. 6 is a section taken along the line VI—VI of FIG. 1.

FIG. 7 is a section taken along the line VII—VII of FIG. 1, said section showing an arrangement for adjusting the press punch.

FIG. 8 is a section taken in the range of the ejector device, said section showing an arrangement for adjusting the ejector.

FIG. 9 is a schematic showing of a control circuit for the press.

Figure 1:
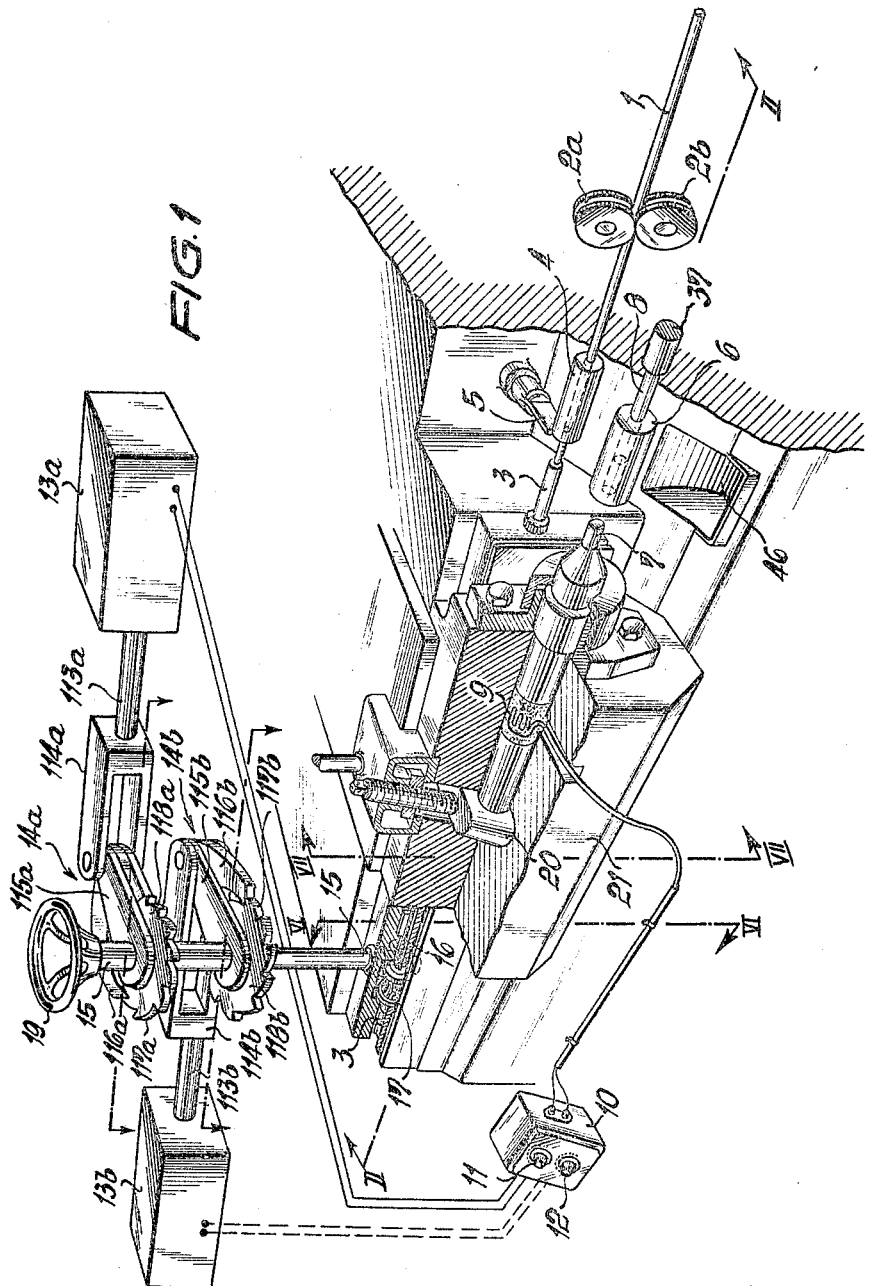
FIG. 1 is a diagrammatic perspective view of a press according to the present invention.

According to the present invention, there is provided a pressure measuring device for measuring the pressure effective at the punch in the die at the transforming end position of the punch. This brings about that without the necessity of manually handling a produced work piece, a measuring result is available on the basis of which the post-setting of the shearing-off length or of the magnitude of the die chamber can be carried out.

More particularly, provision may be made that the pressure measuring device is designed as a pressure indicator known per se and arranged behind the press punch so that the pressure occurring at the press punch in the end position thereof will be directly indicated by the pressure indicator.

As mentioned above, the inventive concept furnishes the possibility automatically to control the setting of the shearing-off length without any action on the part of the operator. To this end, the press according to the invention may be equipped with a control device which in conformity with the measured pressure will automatically adjust the length of the blank to be sheared off from the bar stock or wire stock to such an extent that the pressure which in the end position of the press punch becomes effective in the die will correspond to a quantity of material which will completely fill the die within adjustable and permissable tolerances.

According to a further feature of the invention, the control device may be an electronic system which through lifting magnets, as solenoid actuators, adjusts the abutment in the feeding direction of the press, in one or the other direction.

According to a still further development of the invention, the lifting magnets may be arranged so as to turn an adjusting spindle in one or the other direction through the intervention of ratchet pawl drives which through a worm on said spindle and a worm wheel on the length adjusting abutment bar will displace the latter in longitudinal direction. In this way it will be assured that with the press according to the present invention irregularities in the bar or wire stock material will be compensated for automatically. Furthermore, changes in the volume of the die in view of increasing wear will also be compensated for. It is a well known fact that the tool wear results in a reduced filling of the die and thus in a decrease in the pressure of the press which pressure or, more specifically, the magnitude of such pressure, is employed in conformity with the present invention for carrying out a compensation.

The present invention furthermore results in the production of more uniform end products with a correspondingly reduced amount of waste. The pressing tools are to a similar extent as the machine protected against overload and finally also the operator is relieved to a greater extent because checking and manual adjustment of the abutment for the material will not be necessary any longer.

The press according to the present invention may, of course, be further supplemented by additional control devices as they are in part known in connection with other heretofore known machines. Thus, it is possible, when obtaining the adjusted maximum pressing force, instantaneously to stop the machine, for instance by means of an electropneumatically controlled clutch brake.

Instead of varying the shearing-off length in conformity with the respective occurring pressure, it is also possible to vary the depth of penetration of the press punch. Such an arrangement may be employed in particular in connection with multi-stage presses in which from the second stage on the quantity of material available for the transformation is definite. In such an instance, the press according to the present invention may be provided with a control device which in conformity with the measured pressure automatically adjusts the depth of penetration of the press punch into the die to such an extent that the pressure effective in the die in the end position of the press punch will correspond to a capacity of the die chamber which within adjustable tolerances will precisely correspond to the volume of the available quantity of material.

More specifically, electronically controlled lifter magnets or solenoid actuators may through the intervention of ratchet pawl transmission displace an adjusting wedge located at the back end of the press punch and thereby adjust the press punch in longitudinal direction thereof.

A third modification according to the present invention provides that the depth of penetration of the counter punch or ejector in the die will be varied. In this instance, the press according to the present invention is provided with a control device which depending on the ascertained pressure will automatically adjust the depth of penetration of the counter punch or ejector in the die to such an extent that the pressure effective in the die in the end position of the press punch will correspond to a capacity of the die chamber which within adjustable tolerances will correspond to the volume of the available material.

Inasmuch as the machines according to the present invention as far as their general design is concerned correspond to heretofore known presses, for instance to a machine set forth in U.S. Patent No. 2,436,342, a detailed description of the general design of the press appears to be superfluous, and the present description will be limited to the operation of the machine and the particular features which differentiate the machine according to the present invention over heretofore known presses.

Referring now to the drawings in detail, the bar or wire stock material is by means of the feeding rollers 2a and 2b in conformity with the working cycle of the press fed against the adjustable abutment 3 which in this particular instance is designed as an abutment bar. The piece of material between the abutment bar 3 and the stationary knife part 4 is sheared off by a movable driven shearing knife 5 and moved in front of the die 6, as will be described in greater detail in connection with FIGS. 3 and 4.

Figure 3:
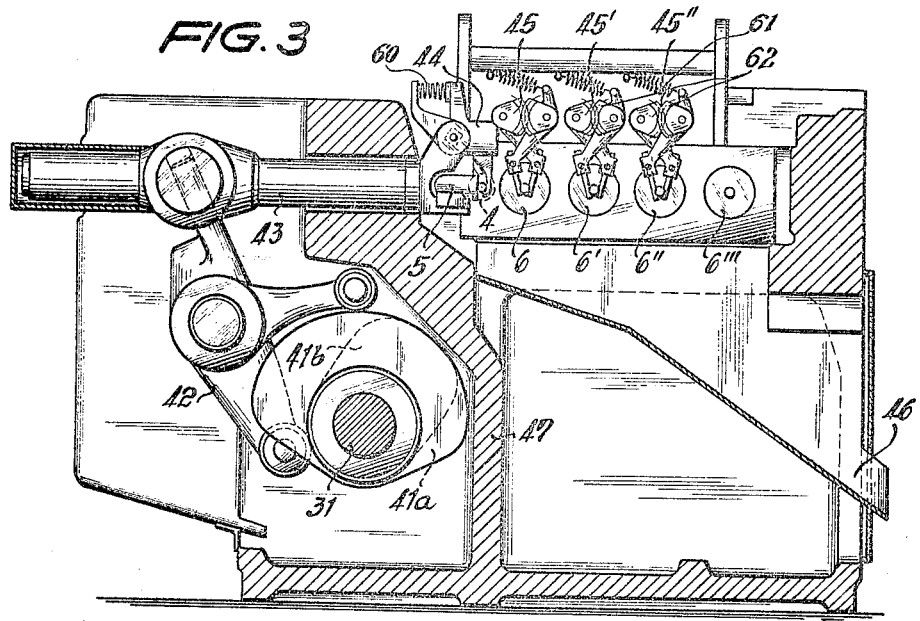
FIG. 3 is a section through the machine within the range of the dies with the press being designed as a multi-stage press.

The press punch 7, which is adjustable as to length, introduces the cut off stock material into the die 6 the rear of which is normally closed by an ejector 8. After the shaping of the work piece has been completed, the press punch 7 returns to its starting position and the ejector 8 ejects the work piece either onto a chute 46 or, if transfer presses are employed, into the transfer fingers which move the thus preformed work piece to the next pressing stage (FIG. 3). Behind the press punch 7 there is arranged a pressure sensitive element 9. The pressure sensitive element 9 may consist of a calibrated pressure piece with glued on strain gauge and is connected to a measuring box or other known pressure indicating means as will be hereinafter described. Pressure detecting and measuring arrangements of this type are well known and are described for instance in the essay, "The Determination of Forming Loads in the Chipless Forming Process on Progressive Cold Headers," by B. Hatebur and A. Wolf, published in "Wire," English Edition No. 55, October 1961.

When transforming a cut off wire piece by means of the press punch 7, the pressure sensitive element 9 measures the force necessary for such transformation and does so at each press stroke while releasing a corresponding signal to a system 10, which may be electronic, which latter has two possibilities of adjustment. These possibilities are indicated by the adjusting knob 11 for adjusting the magnitude of the pressing force, and by the adjusting knob 12 for adjusting the permissible range of tolerances of the pressing force. If the machine is properly adjusted, the pressing force measured by the pressure sensitive element 9 will thus be within the values adjusted by the knobs 11 and 12 of the system 10.

If now a piece of cut off wire stock or bar stock is fed into the machine, the material capacity of which results in a pressing force above or below the values adjusted in the system 10, the said system 10 will release an electric impulse to one of the magnets or solenoid actuators 13a or 13b. From said magnets 13a and 13b respectively protrude magnet pistons or armatures 113a and 113b which are provided with fork-shaped heads 114a and 114b linked to pairs of tilting levers 115a and 115b the free ends of which are linked to the spindle shank 15. Between the lever pairs 115a and 115b there are pivotally arranged the pawls 116a and 116b the free ends of which engage the ratchet teeth 117a and 117b of the ratchet wheels 118a and 118b respectively.

The ratchet arrangement is shown in a detailed way in FIGS. 5 and 5a. The fork-shaped heads 114a, 115a are connected to pawls 116a, 116b by means of pivots 121a, 121b which slide in slots 119a, 119b provided in the end portions of tilting levers 115a, 115b in order to allow an angular displacement thereof. The pawls 116a, 116b are brought into engagement with the ratchet wheels by means of flat springs 120a, 120b when the ratchet arrangement is in an intermediate position as shown in FIGS. 5 and 5a. In this position pawls 116a, 116b are close to the ends of lifting fingers 122a, 122b which are fixed to the stationary housings of magnets 13a, 13b. When e.g. magnet piston 113a (FIG. 5) is advanced pawl 116a is caused to rotate the ratchet wheel in clockwise direction. When magnet pistons 113a, 113b are retracted, however, pawls 116a, 116b are lifted by means of lifting fingers 122a, 122b and thus disengage the teeth of the ratchet wheels. Through the invention of the intermediate transmission generally designated with the reference numerals 14a and 14b, the magnets 13a and 13b will rotate the spindle shank 15 in one or the other direction so that through the intervention of the worm 16 keyed to spindle shank 15 the worm wheel 17 will be rotated which worm wheel is by means of a thread arranged on the abutment bar 3. The details of the worm wheel drive are shown in FIG. 6. As can be seen the abutment bar 3 is threaded and the thread of the bar engages a thread 58 provided in the bore of worm wheel 17. Provision is made for securing abutment bar 3 against rotation. This is achieved by means of a key 59 which is axially spaced from said worm wheel 17. When the worm wheel 17 rotates in one or the opposite direction, the adjusting bar 3 is advanced or retracted. In this way the shearing off length and thus the volume of the material of the cut off wire or bar stock piece will be varied. The shearing off length will be reduced when the pressure sensitive element 9 measures a press pressure which is above the tolerance range adjusted by the knob 12 of the system 10. If, however, the pressure indicator 9 measures a press pressure which is below the tolerance adjusted by the system 10, the shearing off length will be increased. Since the ratchet arrangement generally designated 14a, 14b does not engage the ratchet wheels when magnets 13a, 13b are retracted to their normal position, manual adjustment of the abutment bar 3 may be effected by means of a hand wheel 19.

FIG. 1 shows an adjusting wedge 20 located in a press carriage 21. This wedge 20 makes it possible to vary the length of penetration of the punch 7 into the die 6. This means that by changing the said length of penetration, the press chamber of the die may be varied. Thus, the said press chamber may be increased or decreased in conformity with the press pressure to such an extent that the press chamber will within certain tolerances correspond in volume to the volume of the necessary quantity of material for the work piece to be shaped. While by length adjustment of the adjusting bar 3 the quantity of the starting material will be varied, it will be evident that by adjusting the punch 7, a change in the available die press chamber will be obtained. In both instances, the die chamber and the quantity of material to be shaped will correspond to each other within certain tolerances.

One possibility for adjustment of the adjusting wedge 20 causing an alteraiton of the penetration depth of punch 7 is illustrated in FIG. 7. Adjustment is effected in a similar manner as adjustment of the abutment bar 3 described above. A spindle shank 15a which is driven in the same way as spindle shank 15 carries a bevel gear 48 meshing with a second bevel gear 49 which is keyed to a shaft 50. Through the intervention of a worm 51 being keyed to shaft 50 the worm wheel 52 is rotated. The bore of worm wheel 52 is threaded and engages the thread of spindle 53 thereby effecting adjustment of adjusting wedge 20 which is integral with or fixed to spindle 53. As will be seen from FIGS. 1 and 7 it is also possible instead of changing the depth of penetration of the punch 7, to make the depth of penetration of the ejector 8 variable, in other words to vary the rear dead center position of the ejector 8. A possible arrangement for adjustment of said ejector is shown in FIG. 8. It may be effected in a similar manner as described above in connection with adjusting wedge 20. A shank 15b similar to spindle shank 15 (FIG. 1) carries a worm 54 meshing with a worm wheel 55 which is slidably and non-rotationally connected to a sleeve 56. Sleeve 56 is threaded on its outer surface and engages a thread provided in the housing of the ejector device. The end face of sleeve 56 forms an abutment for a shoulder 57 of ejector bar 37 or ejector 8 respectively. Thus rotation of sleeve 56 results in displacing the rear dead center position of ejector 8 and thereby altering its penetration depth with regard to the die.

If multi-stage presses are involved, the described adjusting devices may be controlled by a multi-channel electronic device of the type described for instance in U.S. Patent No. 2,736,909.

In this way, there exists the possibility in the first stage to determine the shearing-off length of the blank in conformity with the pressure, and in the succeeding stages to vary the magnitude or volume of the die press chamber in conformity with the pressure either by varying the depth of penetration of the press punch or by varying the rear dead center position of the ejector 8.

Figure 2:
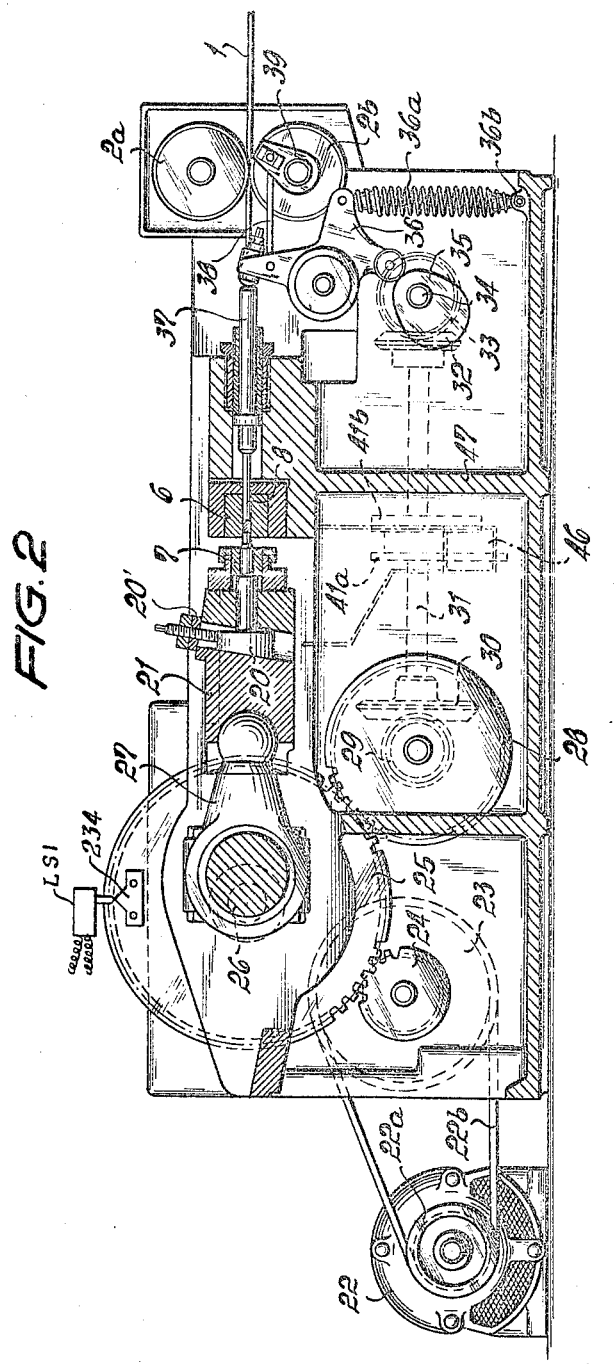
FIG. 2 is a diagrammatic longitudinal section through the press of FIG. 1, said section being taken along the line II—II of FIG. 1.
Figure 4:
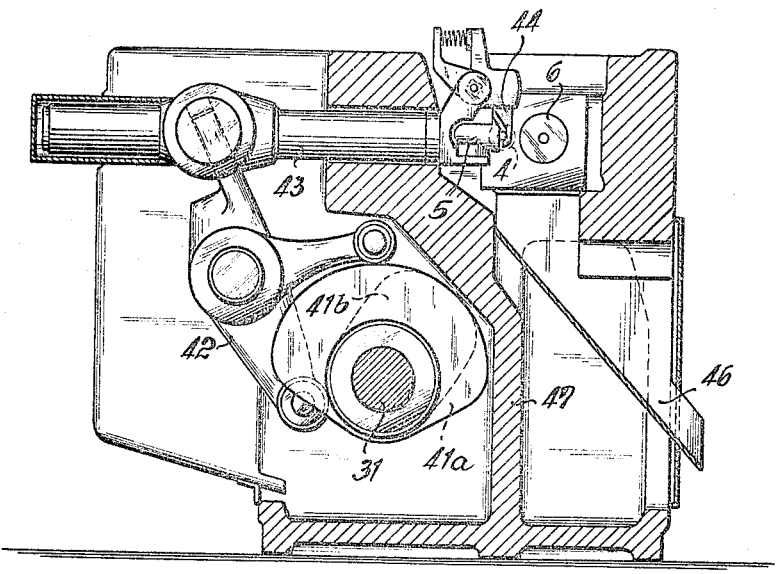
FIG. 4 is a cross section through the machine of FIG. 1 at the height of the die, with the press being designed as a single stage press.

FIGS. 2 to 4 illustrate further details of presses according to the invention. As will be evident from FIG. 2, the main motor 22 drives the fly-wheel 23 through the intervention of pulley 22a and V-belt 22b. Fly-wheel 23, by means of pinion 24 mounted on the same shaft as the fly-wheel, drives the gear 25 and thereby the crank shaft 26 of the press. The connecting rod 27 imparts upon the carriage 21 a reciprocatory movement which is clearly indicated in FIG. 1. The additional gear 28 which meshes with gear 25 drives control shaft 31 through bevel gears 29 and 30, the transmission ratio between crank shaft 26 and control shaft 31 in the particular instance shown being 1:1. Mounted on control shaft 31 are cam discs 41a and 41b which through the intervention of lever 42 (see FIGS. 3 and 4) drives the transverse carriage 43 and thereby the shearing knife 5 (FIG. 1). The bevel gears 32 and 33 at the other end of shaft 31 drive a further control shaft 34 having mounted thereon a cam disc 35. The cam disc 35 through the intervention of lever 36 actuates the ejector bar 37 which in turn drives the ejector 8 of FIG. 1. The arrangement furthermore comprises a rocker 39 which by means of pull rod 38 and lever 36 is moved back and forth. The said rocker 39 which is adjustable in any convenient manner drives the two feeder rollers 2a and 2b by any suitable means, as for instance a pawl ratchet mechanism or an overriding clutch (not shown in the drawings). The rollers 2a and 2b thus feed the wire or bar material in conformity with the working cycle of the machine against the longitudinally adjustable abutment bar 3.

FIG. 3 illustrates in section a multi-stage machine. The machine, in addition to showing the shearing knives 5 and 4, also shows a holding finger 44 which is spring-loaded by means of a pressure spring 60. The sheared off blank is clamped between shearing knife 5 and holding finger 44 and thus prevented from dropping off the knife. The blank is then conveyed to the first die 6. The respective punch pushes the blank into the die. At the same time the shearing carriage 43 is retracted causing holding finger 44 resiliently to slide over the blank being pushed into the die. The press according to FIG. 3 further comprises dies 6′, 6″ and 6‴ which successively receive the blank conveyed to said dies by means of transfer fingers 45, 45′, 45″. These pairs of jaws are spring-loaded and clamp the blanks during transportation by means of tensile springs 61 connected to one jaw of each pair and causing the second jaw of each pair to be moved in the opposite direction by the intervention of tooth segments 62 provided at the pivoted end of each jaw. After the blank has been formed in and ejected from die 6, it is grasped by the jaws 45 and conveyed to the next following transforming die 6′. At the same time the jaws 45′ grasp the blank ejected from the die 6′, and the jaws 45″ grasp the blank ejected from die 6″ and respectively convey the blanks to the next transforming die until it is ejected from the last die into discharging chute 46. As mentioned above, in these transforming stages, a change in the magnitude of the die press chambers may be effected in conformity with the pressure by varying the depth of penetration of the press punches or by varying the rear dead center position of the ejectors.

Finally, with regard to FIG. 4, this figure illustrates a section through a one-stage press which comprises one die 6 only. In this instance, the transverse conveying jaws are omitted. The cut-off wire or bar section is held by the shearing carriage 43 by means of the shearing knife 5 and holding finger 44 and is moved directly in front of the first die 6. Here the blank will by means of punch 7 (FIG. 1) be pushed into die 6 and shaped. Thereupon, the ejector 8 ejects the work piece directly from die 6 into the discharging chute 46.

While the system 10, to which pressure sensitive element 9 is connected, and which system, in conformity with the signals received thereby from element 9, supplies actuating signals to the solenoid actuators 13a and 13b, is made up of known elements performing known operations and is capable of modification, FIGURE 9 shows, by way of example, a simple form of such a system which is operable in the manner generally described in the foregoing specification.

In FIGURE 9, pressure sensitive element 9, which may be a strain gauge of a known type, is connected in a Wheatstone bridge circuit which includes resistors R1, R2, and R3. A source of voltage, such as battery 200, is connected across one pair of opposed terminals of the bridge.

The other pair of opposed terminals of the bridge, connected by wires 202 and 204 with the terminals of an instrument 205 having a moveable arm 206 which will deflect in conformity with the amount of current supplied thereto.

Movable arm 206 is connected by wire 208 with one side of a source of voltage such as battery 210. The movable arm carries contact means 212 adapted for selective engagement with contacts 214 and 216 in two different deflected positions of arm 206 corresponding to respectively low and high rates of current supply to instrument 205. Instrument 205 may be substantially any conventional contact making electrical instrument.

Contact 214 is connected by wire 218 through the input side of an amplifier 220 with the other side of battery 210. Contact 216 is similarly connected by wire 222 through the input side of an amplifier 224 with said other side of battery 210.

The output sides of amplifiers 220 and 224 are connected in circuit with a source of electric power, such as a battery 226 and the actuating coils of respective relays 228 and 230.

Relay 228, when energized, will close its normally open blade 228a which is in circuit with a voltage source such as battery 232 and the coil of solenoid actuator 13a which, for the sake of convenience, is selected as that one of the actuators which is actuated in response to the low limit of the detected pressure.

Similarly, relay 230, when energized, will close its normally open blade 230a which is in circuit with battery 232 and the coil of solenoid actuator 136 which is that one of the actuators which is actuated in response to the upper limit of the detected pressure.

The aforementioned amplifiers 220 and 224, as well as other portions of the system 10, which forms the link between detecting means 9 and actuating means 13a and 13b is enclosed within the line marked 10. System 10, together with actuating means 13a and 13b forms the control means of the present invention which is, in turn, controlled by signals received thereby from measuring as detecting means 9.

The instrument 205 is made adjustable as to range by a variable shunt resistance R4, connected between wires 202 and 204, and which may be in the form of a slide wire variable resistor or, what is somewhat more conventional in instruments, in the form of a tapped resistor. This resistor determines the range of deflection of the instrument and is adjustable by knob 11.

Contained in one of wires 202 and 204 is another variable resistor R5 which may also be of the slide wire type and which is adjustable by knob 12. This resistor determines the sensitivity of the instrument. Thus, knob 11 can be availed of to select the pressure range in which the system 10 will operate while knob 12 can be availed of to select the spread between the low and high limits of pressure. The inclusion of resistors in the circuits of electrical instruments to vary the deflection and sensitivity are well known.

Included in wire 208 is a normally open limit switch LS1 which is positioned to be closed by cam 234 when the press is just at the end of its working stroke and which is the instant that the detected pressure is to be availed of for causing a supply of energy to an actuator if the instrument is in either of its limit positions. Switch LS1 insures that the only controlling pressure is that pressure which is detected at the end of the shaping or forming operation of the machine.

It is, of course, to be understood that the present invention is, by no means, limited to the particular arrangement shown in the drawings but also comprises any modifications within the scope of the appended claims.

What I claim is:

1. In a press for forming work pieces in a chip-less manner, especially from wire and bar stock material: die means for receiving stock material to be formed, first means associated with said die means for acting upon a work piece in said die means and together therewith determining the final size of the product formed in said die means, a stock material receiving and cutting off mechanism including second means for varying the length of the respective piece to be cut off from said stock material, feeding means for feeding cut off stock material to said die means, measuring means operable to measure the pressure to which the work piece in said die means is being subjected at the end of the shaping operation in said die means, and control means operable by said measuring means and operatively connected to one of said first and second means for adjusting the same to bring into harmony with each other the volume of the cut off piece of stock material and the volume of said die means at the end of the shaping operation in said die means.

2. In a press for forming work pieces in a chip-less manner, especially from wire and bar stock material; die means for receiving stock material to be formed, punch means operable to move into said die means to carry out a forming operation, a stock material receiving and cutting off mechanism including adjustable abutment means for determining the length of the stock material to be cut off, measuring means operable to measure the pressure to which said work piece in said die means is being subjected at the end of the shaping operation by said punch means, and control means operable by said measuring means in response to a deviation of the measured pressure in said die means at the end of said forming operation from a certain pressure to adjust said abutment means in such a way that the volume of the stock material length to be cut off will within certain tolerances correspond to the available capacity of said die means at the end of said forming stroke of said punch means.

3. An arrangement according to claim 2, in which said control means compries electronic means and magnetic means operatively connected to said abutment means.

4. In a press for forming work pieces in a chip-less manner, especially from wire and bar stock material; die means for receiving stock material to be formed, punch means operable to move into said die means for carrying out a forming operation, a stock material receiving and cutting off mechanism including adjustable abutment means for determining the length of the stock material to be cut off, measuring means operable to measure the pressure to which said work piece in said die means is being subjected at the end of the shaping operation by said punch means, and control means operable by said measuring means in response to a deviation of the measured pressure in said die means at the end of said forming operation from a certain pressure to adjust said abutment means in such a way that the volume of the stock material length to be cut off will within certain tolerances correspond to the available capacity of said die means at the end of said forming stroke of said punch means, said control means including magnetically operable pawl ratchet means and a worm wheel transmission operatively connected to said abutment means.

5. In a press for forming work pieces in a chip-less manner, especially from wire and bar stock material; die means for receiving stock material to be formed, punch means operable to move into said die means to carry out a forming operation, a stock material receiving and cutting off mechinism for cutting off a certain length of stock material, means for feeding the cut off length of stock material to said die means for shaping by said punch means, measuring means operable to measure the pressure to which the work piece in said die means is being subjected at the end of the shaping operation in said die means, and control means operable by said measuring means and operatively connected to said punch means for adjusting the maximum penetration of said punch means into said die means in response to an excess of a certain minimum deviation of the pressure measured at the end of the shaping operation from a predetermined pressure in such a way that the capacity of said die means at the end of said shaping operation of said punch means corresponds to the volume of the cut off stock material fed into said die means.

6. An arrangement according to claim 5, in which said control means comprises electronic means and magnetically controlled pawl ratchet means and also an adjusting member operatively connected to said pawl ratchet means and to said punch means.

7. In a press for forming work pieces in a chip-less manner, especially from wire and bar stock material, die means for receiving stock material to be formed, punch means operable to move into said die means to carry out a forming operation, a stock material receiving and cutting off mechanism for cutting off a certain length of stock material, means for feeding the cut off length of stock material to said die means for shaping by said punch means, ejector means partially extending into said die means for ejecting the work piece shaped by said punch means, measuring means operable to measure the pressure to which the work piece in said die means is being subjected at the end of the shaping operation in said die means, and control means operable by said measuring means and operatively connected to said ejector means for adjusting the maximum penetration of said ejector means in response to an excess of a certain minimum deviation of the measured pressure at the end of the shaping operation from a predetermined pressure in such a way that the capacity of said die means at the end of said shaping operation of said punch means corresponds to the volume of said cut off stock material fed into said die means.

References Cited by the Examiner
UNITED STATES PATENTS

| | | | |
|---|---|---|---|
| 1,971,937 | 8/1934 | Keck | 78—9 |
| 2,436,342 | 2/1948 | Wilcox | 10—76 |
| 2,455,823 | 12/1948 | Tauber | 25—45 |
| 3,105,399 | 10/1963 | Strugala | 78—96 |

CHARLES W. LANHAM, *Primary Examiner.*

WILLIAM J. STEPHENSON, *Examiner.*

G. P. CROSBY, *Examiner.*